United States Patent [19]

Wymore

[11] Patent Number: 4,891,903

[45] Date of Patent: Jan. 9, 1990

[54] COMBINATION SLIDING OR FIXED FISHING SINKER

[76] Inventor: Roger S. Wymore, 4612 F Ave. NE., Cedar Rapids, Iowa 52402

[21] Appl. No.: 235,049

[22] Filed: Aug. 23, 1988

[51] Int. Cl.$^4$ .............................................. A01K 95/00
[52] U.S. Cl. ................................................ 43/44.89
[58] Field of Search .................. 43/44.89, 44.90, 44.91

[56] References Cited

U.S. PATENT DOCUMENTS

| | | | |
|---|---|---|---|
| 2,033,108 | 4/1936 | Henley | 43/44.9 |
| 2,753,652 | 7/1956 | Romaine | 43/44.9 |
| 4,351,128 | 9/1982 | Siversten | 43/44.91 |
| 4,459,775 | 7/1984 | Ratte | 43/44.89 |
| 4,615,135 | 10/1986 | Swinbanks et al. | 43/44.9 |

*Primary Examiner*—Nicholas P. Godici
*Assistant Examiner*—Michael William Starkweather

[57] ABSTRACT

A fishing sinker to be used as either a sliding sinker or a non-sliding sinker comprised of a body 20 with flatted side supporting two end tabs 22 defining a through hole and a centered element 26 integrated with an intermediate portion 28 in a way to define an open slot 30 and two transverse slots 34. The end tabs are movable and open to the opposite side from the main slot thus providing a sine wave path for the line to be threaded. Once in place the line 36 follows a straight path allowing the sinker to slide on the line. The tabs are then pressed against the body thus securing the line within the through hole. A looping of the line around the intermediate portion 28 may be used to fix the line frictionally to the sinker. Again the line is threaded under the tabs to complete the mounting. The tabs are again set so as to secure the line.

4 Claims, 2 Drawing Sheets

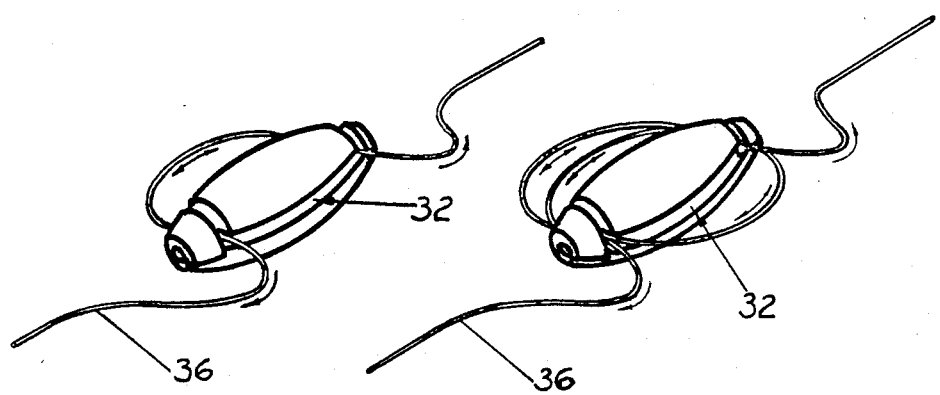
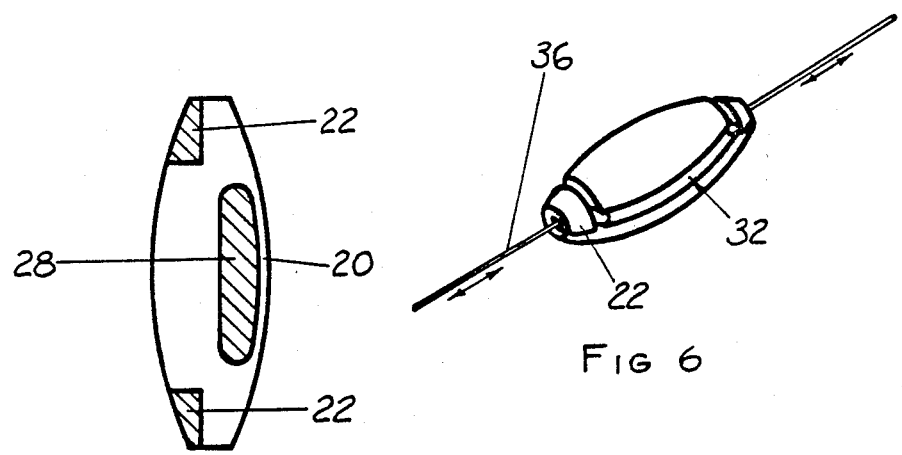
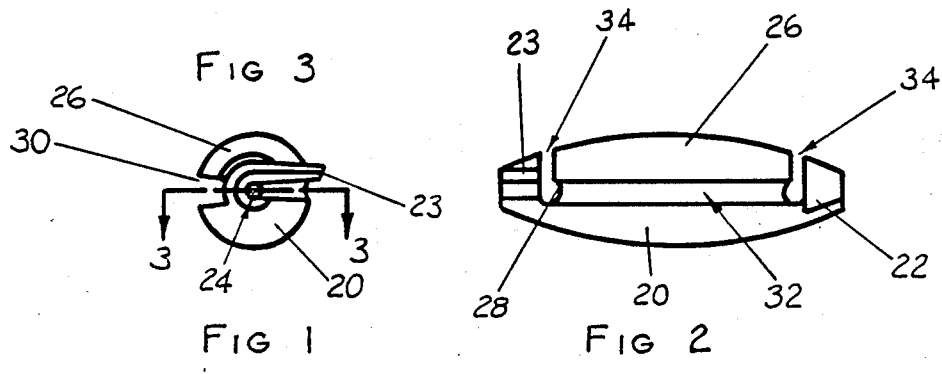

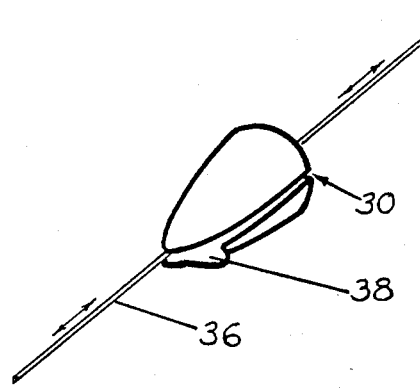
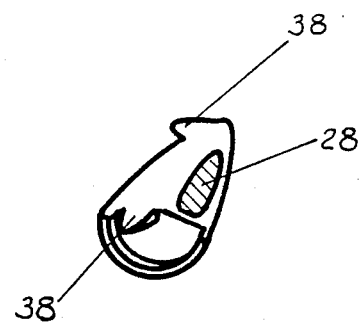
FIG 9    FIG 10
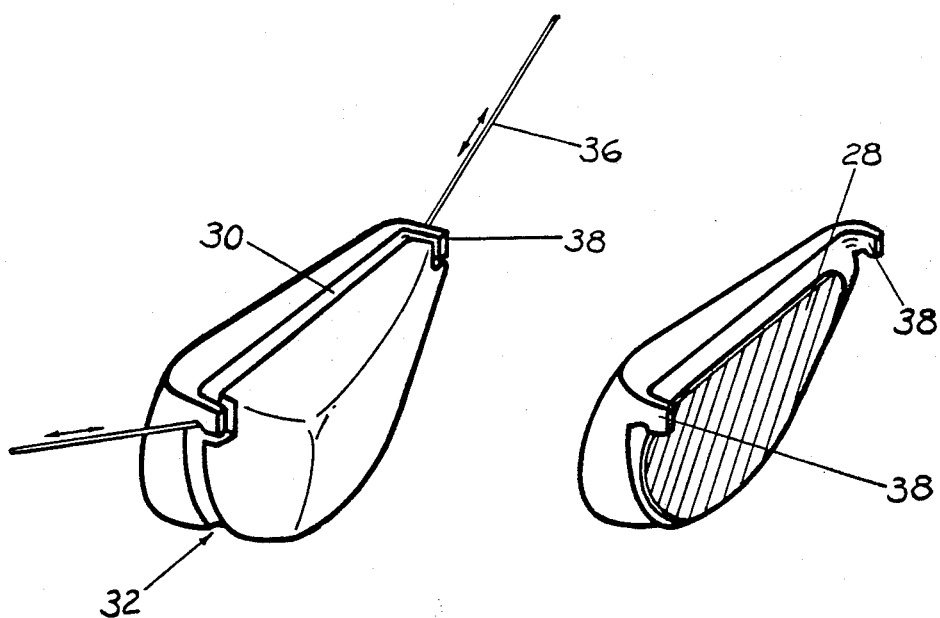
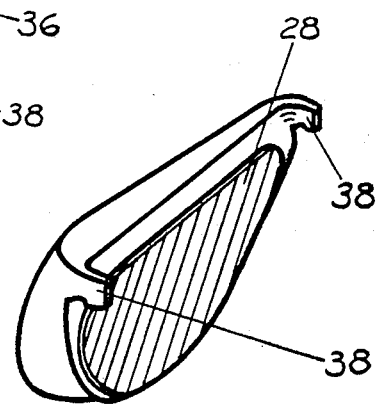
FIG 7    FIG 8

COMBINATION SLIDING OR FIXED FISHING SINKER

BACKGROUND

1. Field of Invention

This invention relates to sport fishing tackle, especially to weighting line, hook and bait so that the bait can achieve a more advantageous depth for catching fish and most especially so the fisherman can spend less time preparing and more time fishing.

2. Description of Prior Art

Certain fish such as Catfish and Walleyes inhabit and feed near the bottom of fish supporting waters and other fish such as Bass and Crappies feed nearer the surface. Slipsinkers have become quite popular for fishing near the bottom.

Both Catfish and Walleyes are very sensitive to line tension. They mouth the bait, pulling it along until they become satisfied it is edible. A fixed sinker can cause this tension. The most successful fishermen have found that a sinker which allows the line to slide through it is best. The first nibble becomes a signal to feed the line out for several seconds giving the fish time to adjust to its intended meal.

Fishing with a bobber most generally requires the use of a fixed sinker. The length of line between bobber and sinker determines the depth at which the bait will be fished. By fixing the sinker a ways from the bait, it allows the bait some freedom to move. Again it appears more natural to the fish.

There are many good sliding type sinkers in common use today. But most all require the line be cut and threaded through the sinker. There are some around that can be slipped onto the line and secured by loops or tabs. These have not gained a very large share of the market due in part possibly to marketing effort. They have not been adapted to the more popular shapes such as the 'egg sinker', 'walking sinker' or the 'worm weight'.

The fixed sinkers have been designed to accept line without first severing. These are among the more popular sinkers in use. One has a central core of rubber with a slit in the side of the lead to accept the line. The line and rubber are twisted together to fix the sinker to the line. Another has tabs which when closed pinch the line to prevent movement.

Both of these sinkers present some drawbacks. The rubber cored sinker is sometimes difficult to remove. If the light is poor it becomes difficult to know if untwisting is complete or if too much untwisting has occured. Also sometimes the fisherman may not remember which is the correct direction to unwind.

The pinch-on is perceived by some as being damaging to the fishing line. Split shot are like the pinch-on in that they require physical pressure on the line. They carry the same perceptions of line damage.

To my knowledge there have never been sinkders that readily convert from sliding sinkers to fixed sinkers and back again. This type of sinker is highly desirable especially if it may be applied without first cutting the line.

OBJECTS AND ADVANTAGES

Accordingly I claim the following as our objects and advantages of the invention: to provide a new and novel sinker, cast of a single, integral material which will never require the line to be severed for the purpose of adding or changing sinkers and to provide a sinker which can be attached to the line as either a sliding sinker or a fixed sinker.

It is also the object to show that this design has universality in that it can be applied to several popular shapes now in use without destroying the basic purpose of the particular sinker.

DRAWING FIGURES

FIG. 1 shows an orthographic end view of a sinker designed according to the invention.

FIG. 2 shows a side view of FIG. 1.

FIG. 3 shows a sectioned view according to Section A—A.

FIG. 4 shows a perspective view with the line being inserted for sliding mode use.

FIG. 5 shows a perspective view with the line being inserted for fixed mode use.

FIG. 6 shows the line in place as either a sliding sinker or, without the movement arrows, as a fixed sinker.

FIG. 7 shows a walking style sinker using prior art tab design.

FIG. 8 shows the walking style of FIG. 7 with one half removed illustrating the annular path.

FIG. 9 shows a worm weight used in bass fishing with prior art tab design.

FIG. 10 shows the worm weight of FIG. 9 revolved 180 degrees with the top half removed to show the annular path.

SLIP OR GRIP SINKER—DESCRIPTION

FIG. 1 and FIG. 2 show all the essential elements of the embodiment of the invention. The sinker is comprised of a body 20, a top element 26, an intermediate portion 28, an end tab 22 and the opposite end tab in the 'as molded' position 23. The body 20 and top element 26 are relatively flat on at least one side. The flat surfaces are centered, spaced a distance apart and parallel with each other. The top element 26 is approximately one-half the length of the body 20. The two are joined by an intermediate portion 28 into an integral unit so as to leave a slot 30 extending outward from a through hole 24 located in the vicinity of the longitudinal center. The two end tabs 22 are affixed to the ends of the body 20 so as to form transverse slots 34 along the ends of the top element 26. The tabs 22 form movable flaps which along with the body 20 define the through hole 24. The tabs 22 open to the side opposite the central slot 30 with the flap ends overlying the body 20.

FIG. 7 and FIG. 8 also show all the embodiments of the invention. FIG. 7 shows a groove 30 which has a depth equal to approximately the diameter of most fishing line plus the height of the security tabs 38. The groove 32 provides an annular continuation of the groove 30. FIG. 8 shows FIG. 7 with the right half removed.

FIGS. 9 and 10 also show all the embodiments of the invention. FIG. 9 shows a line passing through the center of a bullet-shaped body with a front security tab 38 in the nonsecuring position. FIG. 10 shows FIG. 9 with the top half removed, both security tabs remaining with the bottom half. Once again, the tabs are placed on the opposite side of the pathway provided for a sliding mode and may be bent across the groove 30 for securing in either mode.

In all cases shown, the security devices are placed on opposite sides, from the annular portion, of the straight line pathway given to sliding.

SLIP OR GRIP SINKER—OPERATION

FIG. 4 shows fishing line 36 placed across the body 20 into the transverse slots 34. Each end of the fishing line 36 is then slipped under each end tab 22 and FIG. 6 is the result. All that remains in order to have a perfect slip sinker is to close the tabs 22 onto the body 20.

FIG. 5 illustrates the looping of the line 36 around the intermediate portion 28. Again, all that remains is to slip the line 36 under the tabs 22 and close them against the body 20 and a fixed sinker is in place. As the fishing line 36 grows in weight and becomes stiffer it becomes necessary to loop the line several times around the ihtermediate portion 28. FIG. 6 would also show the final look of the sinker on the line 36 except the line loop, or loops, would show in the annular groove 32.

FIG. 8 and FIG. 10 show clearly the throughways for freely sliding on the line. The security tabs 38 are always located on the opposite side of the throughway from the sectioned portions 28. These portions 28 provide the annular posts about which the lines are looped whenever the user wishes to change to grip, or nonsliding, sinker modes. In either case the tabs securely entrap the line within the sinker body and provide for easy release whenever changes of sinkers are desirable.

I claim:
1. A combination sliding and fixed fishing sinker comprising:
   a lead body;
   a circumferential slot dividing said body into first and second sides; and
   a loop member on each of opposite ends of said body located proximate said circumferential slot;
   whereby the combination sliding and fixed fishing sinker is mounted on a fishing line by either: first, wrapping the line around said body, within said circumferential slot, thus achieving the fixed fishing sinker mode; or second, threading the line straight through one side of said slot and under said loop members on either end of said body, thus allowing for the sinker's slipping along the line and achieving the slip sinker mode.

2. A combination sliding and fixed fishing sinker as in claim 1 wheein the lead body is of a bullet shaped fishing sinker, and said loop members are bent across said circumferential slot in order to hold the sinker on the line during both the sliding and fixed sinker modes.

3. The invention of claim 1, wherein the lead body is of an egg shaped sinker, and said loop members form a U-shape, parallel with said slot.

4. The sinker of claim 1, wherein the lead body is of a walking sinker shape, and where said loop members extend across said slot.

* * * * *